United States Patent Office 3,328,385
Patented June 27, 1967

3,328,385
DISAZO PIGMENTS
Hansrolf Loeffel, Neu-Allschwil, and Willy Mueller, Riehen, Switzerland, assignors to Ciba Limited, Basel, Switzerland, a company of Switzerland
No Drawing. Filed Oct. 18, 1963, Ser. No. 317,125
Claims priority, application Switzerland, Oct. 23, 1962, 12,402/62
6 Claims. (Cl. 260—174)

The present invention provides valuable new disazo pigments of the formula (1)  A—N=N—B—CONHR—
                  NHCO—B—N=N—A in which A represents an anthraquinone radical, B represents the radical of a coupling component, which radical contains a hydroxyl group or an enolizable keto group in ortho position to the azo group, and R represents the radical of a diamine.

In the Formula 1 above, A advantageously represents the radical of an α-aminoanthraquinone and R an arylene radical. Of special interest are dyestuffs of the formula (2)

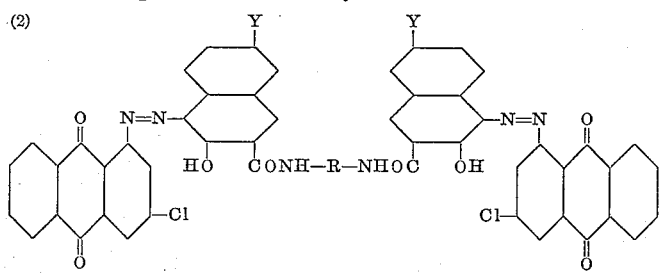

in which R has the meaning given above, and Y represents a hydrogen atom or a halogen atom or an alkoxy group.

The new dyestuffs are obtained when two mols of a carboxylic acid halide free from acidic groups imparting solubility in water, especially sulfonic acid or carboxylic acid groups, that corresponds to the formula (3)            A—N=N—B—COHal in which A and B have the meanings given above, are condensed with a diamine free from acidic groups imparting solubility in water.

The carboxylic acids from which the azo dyestuff carboxylic acid halides of the Formula 3 are derived are advantageously obtained by coupling a diazotized aminoanthraquinone, especially an α-aminoanthraquinone, with a phenolic or an enolic coupling component containing a carboxylic acid group or a carboxylic acid ester group, it being necessary in the latter case to hydrolyse the ester group. The following aminoanthraquinones may be mentioned:

1-aminoanthraquinone,
1-amino-2-chloranthraquinone,
1-amino-2-bromanthraquinone,
1-amino-3-chloranthraquinone,
1-amino-6- or 7-chloranthraquinone,
1-amino-5:8-dichloranthraquinone,
1-amino-8-chloranthraquinone,
1-amino-3-bromanthraquinone,
1-amino-2:4-dibromanthraquinone,
1-amino-2-methylanthraquinone,
1-amino-3-fluoranthraquinone,
1-amino-4-, 5- or 6-methoxyanthraquinone,
1-amino-3-trifluoromethylanthraquinone,
1-amino-4- or 5-benzoylaminoanthraquinone,
1-amino-4-cyananthraquinone,
1-amino-3-cyananthraquinone,
1-amino-4-nitroanthraquinone,
1-amino-2-bromo-4-cyananthraquinone,
2-aminoanthraquinone,
2-amino-3-chloranthraquinone,
2-amino-3-bromanthraquinone,
2-amino-1:3-dichloranthraquinone,
2-amino-3-methoxyanthraquinone, and
5-amino-1:9-isothiazole-anthrone.

The following coupling components may be particularly mentioned:

2-hydroxy-3-naphthoic acid,
6-bromo-2-hydroxy-3-naphthoic acid, and
6-methoxy-2-hydroxy-3-naphthoic acid.

Also suitable are:

2-hydroxycarbazole-3-carboxylic acid,
2-hydroxydiphenyleneoxide-3-carboxylic acid,
2-hydroxyanthracene-3-carboxylic acid,
1-(meta or para-carboxyphenyl)-3-methyl-5-pyrazolone,
  acetoacetic acid ethyl ester,
3- and 4-acetoacetylaminobenzene carboxylic acid.

The azo dyestuff carboxylic acids thus obtained are treated with agents that are capable of converting carboxylic acids into their acid halides, for example, their acid chlorides or bromides, particularly with phosphorus halides such as phosphorus pentabromide or phosphorus trichloride or phosphorus pentachloride, phosphorus oxyhalides and advantageously with thionly chloride.

The treatment with acid halogenating agent of the kind defined is advantageously carried out in an inert organic solvent such as dimethylformamide, a chlorobenzene, for example, monochlorbenzene or dichlorobenzene, toluene, xylene or nitrobenzene; in the case of the five last-mentioned solvents, the treatment may be carried out with the addition of dimethylformamide.

In the preparation of the carboxylic acid halides it is generally of advantage first to dry the azo compounds that have been prepared in aqueous medium or to free them from water by azeotropic distillation in an organic solvent. If desired, this azeotropic drying can be carried out immediately prior to the treatment with the acid halogenating agents.

In accordance with the process of the invention, the monocarboxylic acid halides so obtained are condensed in a molar ratio of 2:1 with diamines, especially aromatic diamines, advantageously those of the benzene or diphenyl series. As diamines of the benzene series there may be mentioned more especially those of the formula

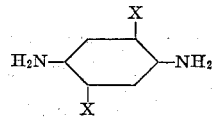

in which X represents a hydrogen or a halogen atom or a low-molecular alkyl or alkoxy group.

As examples the following amines may be mentioned:
ethylenediamine,
1:4-diaminobenzene,
1:3-diaminobenzene,
1:3-diamino-4-methylbenzene, 1:3-diamino-4-methoxybenzene,
1:3-diamino-4:6-dichlorobenzene,
1:3-diamino-4-chlorobenzene,
1:3-diamino-2:5-dichlorobenzene,
1:4-diamino-2-chlorobenzene,
1:4-diamino-2-bromobenzene,
1:4-diamino-2-cyanobenzene,
1:4-diamino-2:5-dichlorobenzene,
1:4-diamino-2-methylbenzene,
1:4-diamino-2:5-dimethylbenzene,
1:4-diamino-2-chloro-5-methylbenzene,
1:4-diamino-2-methoxybenzene,
1:4-diamino-2:5-dimethoxybenzene,
1:4-diamino-2:5-diethoxybenzene,
1:3-diamino-4:6-dimethylbenzene,
1:3-diamino-2:6-dimethylbenzene,
4:4'-diaminodiphenyl,
3:3'-dichloro-4:4'-diaminodiphenyl,
3:3'-dimethyl-4:4'-diaminodiphenyl,
3:3'-dimethoxy-4:4'-diaminodiphenyl,
3:3':5:5'-tetrachloro-4:4'-diaminodiphenyl,
3:3'-dichloro-5:5'-dimethyl-4:4'-diaminodiphenyl,
2:8-diaminochrysene,
4:11-diaminofluoranthene,
2:6- or 1:5-diaminonaphthalene,
diaminobenzenthiazole such as
2-(4'-aminophenyl)-6-aminobenzthiazole.

The condensation between the carboxylic acid halides of the kind defined above and the amines is advantageously carried out in an anhydrous medium. Under these conditions it generally proceeds surprisingly easily even at temperature within the boiling range of the common organic solvents, for example, toluene, monochlorobenzene, dichlorobenzene, trichlorobenzene, nitrobenzene and the like. (In order to accelerate the reaction it is generally of advantage to use an agent capable of binding acid, for example, anhydrous sodium acetate or pyridine.) Some of the dyestuffs obtained are in the form of crystals and some are amorphous, and most of them are obtained in a good yield and in a pure state. It is advantageously first of all to separate the acid chlorides prepared from the carboxylic acids. In some cases, however, separation of the acid chlorides can be dispensed with without harm, and the condensation carried out immediately subsequent to the preparation of the carboxylic acid chlorides.

The new dyestuffs are valuable pigments that can be used for a very wide variety of purposes. For example, they can be used in a finely divided form for the spin dyeing of rayon and viscose, cellulose ethers, cellulose esters, polyamides, polyurethanes and polyesters; for the manufacture of colored lacquers or as lake-formers; and for coloring solutions and products made of cellulose acetate, nitrocellulose, natural or synthetic resins such as polymerization or condensation resins, for example, aminoplasts, alkyd resins, phenoplasts, polyolefines such as polystyrene, polyvinylchloride, polyethylene, polypropylene, polyacrylonitrile, rubber, caseine, silicone and silicone resins. They can also be used with advantage in the manufacture of colored pencils, cosmetic preparations and laminated sheet material.

In contrast with the nearest comparable dyestuffs described in German patent specification No. 921,223 which differ from the dyestuffs of the invention in that they contain a benzene radical instead of an anthraquinone radical, the dyestuffs of the invention are distinguished by a substantially better fastness to light.

In contrast with comparable dyestuffs described in United States specification No. 2,273,116, the dyestuffs obtained by the process of the invention are distinguished by a substantially better fastness to migration.

The following examples illustrate the invention. Unless otherwise stated, the parts and percentages are by weight.

*Example 1*

130 parts of sulfuric acid monohydrate were cooled to 10° C. and 7.1 parts of sodium nitrite were introduced in small portions with rapid stirring. The nitrosyl sulfuric acid was then heated to 70° C. in the course of 40 minutes, maintained at that temperature for 30 minutes and then cooled to room temperature. 25.75 parts of 1-amino-3-chloranthraquinone were then added in the course of 1 hour, and the whole stirred for 1 hour at 20 to 25° C. The sulfuric acid solution was then cautiously poured on to 350 parts of ice, when the diazonium sulfate precipitated in the form of a yellow suspension.

The solution of coupling component was prepared as follows:

19.1 parts of 2:3-hydroxynaphthoic acid were dissolved in 400 parts of a 1:1 mixture of alcohol and water and 20 parts of aqueous 30% sodium hydroxide solution. After filtering until clear, 30 parts of sodium acetate were added and the pH value adjusted to 6 with acetic acid.

The solution was cooled to 10° C. and then the diazonium sulfate was allowed to run in (pH 4 to 6) with simultaneous dropwise addition of concentrated sodium hydroxide solution. After the coupling, the reaction mixture was heated to 70 °C., filtered and the filter residue washed free from salt. 190 parts of moist filter residue were obtained.

The press cake was feed from water azeotropically in 650 parts of ortho-dichlorobenzene by heating to an internal temperature of 150° C. (with the use of a descending condenser). After cooling to 90° C., one part of dimethylformamide and 24 parts of thionyl chloride were added dropwise, and the whole stirred for 2 hours at 100 to 110° C. The reaction mixture was allowed to cool to 20° C., filtered, the filter residue washed with 520 parts of dichlorobenzene and 400 parts of benzene, and the acid chloride dried in vacuo at 50° C.; yield: 43.35 parts.

4.75 parts of the acid chloride were introduced into 350 parts of dichlorobenzene at room temperature. 0.885 part of 2:5-dichloro-1:4-phenylenediamine, dissolved in 130 parts of dichlorobenzene, were then added. The whole was heated to 60° C., the temperature raised to 140° C. in the course of 8 hours, and the reaction mixture stirred for a further 8 hours at 140° C. The pigment thus formed was isolated by filtration at 100° C. and then washed with 320 parts of hot dichlorobenzene, 160 parts of methanol and 200 parts of water. 4.85 parts of the dyestuff of the formula

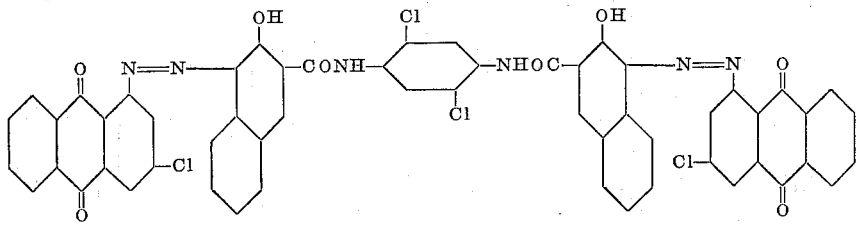

were obtained which, when incorporated in polyvinylchloride on a roller mill, gave a yellowish red tint possessing a very good fastness to light and to migration.

In the following table are listed further components which yield pigment dyestuffs by diazotizing the diazo components listed in column I, coupling with 2-hydroxy-3-naphthoic acid, preparation of the acid chloride of the azo dyestuff carboxylic acid thus obtained and condensing the latter in a molar ratio of 2:1 with the diamines listed in column II. Column III indicates the tints obtained with the pigments in a polyvinyl chloride film.

| | I | II | III |
|---|---|---|---|
| 1 | 1-amino-3-chloranthraquinone | Dichloro-paraphenylene-diamine | Yellowish red. |
| 2 | ----do---- | Monochloro-paraphenylenediamine | Red. |
| 3 | ----do---- | Chloro-methylpara-phenylenediamine | Red. |
| 4 | ----do---- | Chloro-methoxy-para-phenylenediamine | Red. |
| 5 | ----do---- | Dichlorobenzidine | Red. |
| 6 | ----do---- | Dimethyl-para-phenylenediamine | Bluish Red. |
| 7 | ----do---- | Dimethylbenzidine | Do. |
| 8 | ----do---- | Para-phenylenediamine | Do. |
| 9 | ----do---- | Benzidine | Do. |
| 10 | 1-aminoanthraquinone | Dichloro-para-phenylenediamine | Red. |
| 11 | ----do---- | Benzidine | Bluish red. |
| 12 | 1-amino-2-bromanthraquinone | Dichlorobenzidine | Do. |
| 13 | 1-amino-8-chloranthraquinone | Dichloro-para-phenylenediamine | Red. |
| 14 | 2-aminoanthraquinone | ----do---- | Yellowish red. |
| 15 | 2-amino-3-chloranthraquinone | ----do---- | Red. |
| 16 | ----do---- | Para-phenylene diamine | Bluish red. |
| 17 | 2-amino-1:3-dichloroanthraquinone | ----do---- | Do. |
| 18 | 2-amino-3-bromo-anthraquinone | Para-phenylenediamine | Do. |
| 19 | ----do---- | Dichloro-para-phenylenediamine | Red. |
| 10 | 1-amino-2:4-dibromoanthraquinone | Dichlorobenzidine | Brown. |
| 21 | ----do---- | Dichloro-para-phenylenediamine | Do. |
| 22 | 1-amino-3-trifluoromethylanthraquinone | ----do---- | Red. |

The 1-amino-3-trifluoromethylanthraquinone could be prepared as follows:

1-amino-2-methyl-4-bromanthraquinone was converted into 1-bromo-3-methylanthraquinone (M.P. 204 to 205° C.) by diazotizing and boiling the diazonium salt in alcohol. 1-chloro - 3 -trichloromethylanthraquinone (M.P. 155.5 to 156.5° C.) was obtained therefrom by chlorination in boiling orthodichlorobenzene. Treatment with anhydrous hydrofluoric acid yielded 1-chloro-3-trifluoromethylanthraquinone, which produced 1-toluenesulfonylamino-3-trifluoromethylanthraquinone (M.P. 228.5 to 229° C.) when reacted with para-toluenesulfonamide. The 1-toluenesulfonylamino - 3 - trifluoromethylanthraquinone was hydrolysed with cold concentrated sulfuric acid to form 1-amino - 3 - trifluoromethylanthraquinone (M.P. 223.5 to 224.5° C.).

Example 2

As described in Example 1, 13.38 parts of 1-amino-3-chloranthraquinone were diazotized in 75 parts of monohydrate and 4 parts of sodium nitrite and then cautiously poured on to 250 parts of ice.

11.38 parts of 3-methyl - 1 - phenyl-(3'-carboxy-)-5-pyrazolone were dissolved in 260 parts of a 1:1 mixture of alcohol and water and 10 parts of 30% sodium hydroxide solution. After filtering until clear, 20 parts of sodium acetate were added and the pH value adjusted to 6 with acetic acid.

Coupling was carried out at 10° C. and at a pH value of 4 to 6 in a manner analogous to that described in Example 1. 70 parts of a brown press-cake were obtained which was feed from water azeotropically in 390 parts of dichlorobenzene in a manner analogous to that described in Example 1. After cooling to 90° C., 1 part of dimethylformamide, 12 parts of thionyl chloride and a further 130 parts of dichlorobenzene were added dropwise. The whole was stirred for 2 hours at 100° C., whereupon the reaction mixture was cooled to 20° C., filtered, and the filter residue washed with 340 parts of dichlorobenzene and 300 parts of benzene. 17.5 parts of azo dyestuff carboxylic acid chloride were obtained after drying.

2.55 parts of the acid chloride thus obtained were introduced into 130 parts of dichlorobenzene and then condensed with 0.447 part of 2:5-dichloro-1:4-phenylenediamine dissolved in 90 parts of dichlorobenzene in a manner analogous to that described in Example 1.

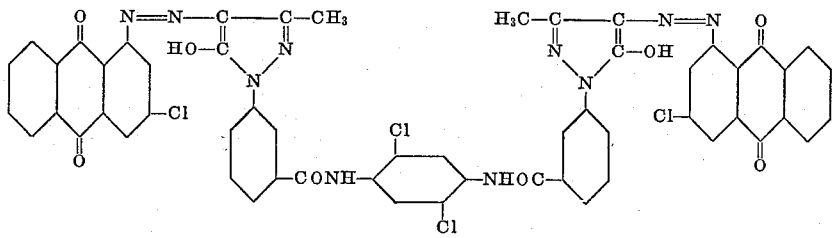

The reaction mixture was filtered, and the filter residue washed with 160 parts of hot dichlorobenzene, 80 parts of methanol and 100 parts of water; yield: 2.4 parts of the dyestuff of the formula When worked into polyvinyl chloride on a roller mill, it yielded yellow tints possessing a very good fastness to migration and a good fastness to light.

A reddish yellow was obtained by using benzidine instead of 2:5-dichloro-1:4-phenylenediamine.

Example 3

25.7 parts of 1-amino-3-chloranthraquinone and 30 parts of 30% hydrochloric acid were stirred for several hours in 150 parts of 100% acetic acid, the suspension cooled to 0 to 5° C., and then diazotized at 0 to 5° C. by the dropwise addition of 6.9 parts of sodium nitrite dissolved in 20 parts of water. A clear, yellow diazo solution was obtained. This solution was then run into a solution of 15 parts of acetoacetic acid methyl ester and 30 parts of crystalline sodium acetate in 600 parts of water at 30 to 35° C. Coupling was instantaneous. The reaction mixture was stirred for 1 hour at 30 to 35° C., filtered, and the filter residue washed with cold water until as free from salt as possible.

The moist press-cake was then stirred in 600 parts of methanol, and 50 parts by volume of 30% sodium hydroxide solution were aded. The mixture was stirred for 1 hour at 55 to 58° C., during which process the sodium salt of the azo dyestuff carboxylic acid separated out in the form of a yellow-olive precipitate. After hydrolysis, the reaction mixture was rendered acid to congo paper at 75° C. with 75 parts of concentrated hydrochloric acid, filtered, the filter residue washed free from salt with water and then dried. 28 parts of an azo dyestuff carboxylic acid of the formula

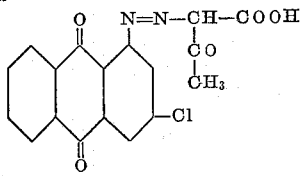

were obtained.

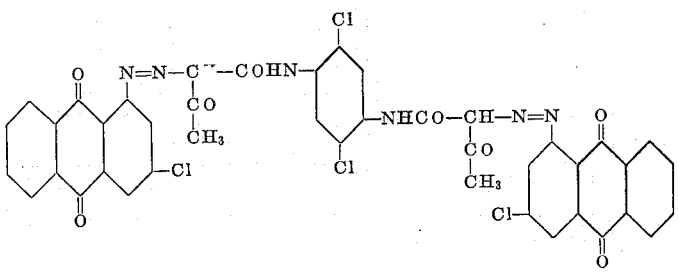

37.08 parts of the azo dyestuff carboxylic acid were stirred in 350 parts of ortho-dichlorobenzene, 0.2 part of dimethylformamide was added and then 12 parts of thionyl chloride were added dropwise at 95 to 100° C. Stirring was continued until the chlorination was complete, that is to say, for about 1 hour at 100 to 110° C. When the clear, yellow solution cooled, the azo dyestuff carboxylic acid chloride precipitated in the form of handsome golden-yellow needles. The product was isolated by suction filtration, washed with benzene and then dried in vacuo at 40 to 45° C.: melting point 233° C. The azo dyestuff carboxylic acid chloride corresponded to the formula

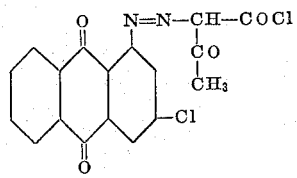

3.9 parts of the acid chloride thus obtained were stirrred in 150 parts of ortho-dichlorobenzene and dissolved at 90 to 95° C. 0.9 part of 2:5-dichloro-1:4-phenylenediamine dissolved in 30 parts of ortho-dichlorobenzene was added and condensation carried out for 8 hours at 140 to 145° C. The reaction mixture was cooled to 100° C. and filtered. The filter residue was washed successively with 300 parts of dichlorobenzene at 130° C. and 150 parts of cold methanol. Finally, it was washed with hot water and then dried in vacuo at 95 to 100° C. About 4 parts of a soft, yellow pigment powder were obtained that colored synthetic materials and lacquers pure, greenish yellow tints possessing a very good fastness to migration, to overstripe bleeding and to light it corresponded to the formula By replacing, in the above example, 2:5-dichloro-1:4-phenylenediamine with 2-chloro-5-methyl-1:4-phenylenediamine, a neutral yellow having the same good properties was obtained. When it was replaced with benzidine or 2:5-dimethyl-1:4-phenylenediamine, a reddish yellow and an orange were obtained respectively, both tints exhibiting the same good properties as when 2:5-dichloro-1:5-phenylenediamine was used.

What we claim is:

1. A disazo pigment of the formula

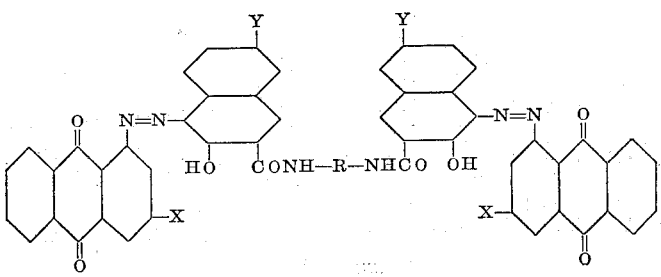

in which X is a member selected from the group consisting of chlorine, bromine and trifluoromethyl, Y is a member selected from the group consisting of hydrogen, bromine and lower alkoxy, R is a member selected from the group consisting of phenylene and diphenylene radicals either unsubstituted or substituted by chlorine, lower lower alkyl and lower alkoxy groups.

2. A disazo pigment of the formula shown in claim 1 in which R is a radical of the formula

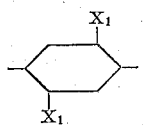

in which $X_1$ represents a member selected from the group consisting of hydrogen, chlorine, lower alkyl and lower alkoxy.

3. The dyestuff of the formula
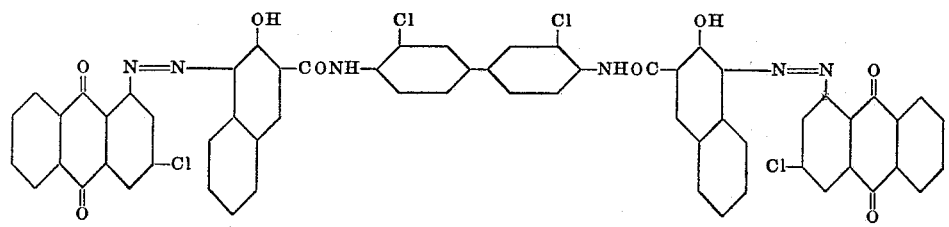
4. The dyestuff of the formula
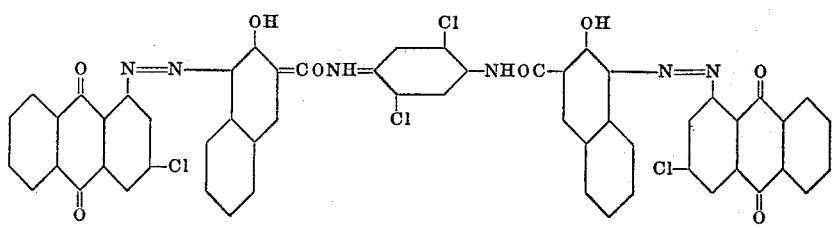
5. The dyestuff of the formula
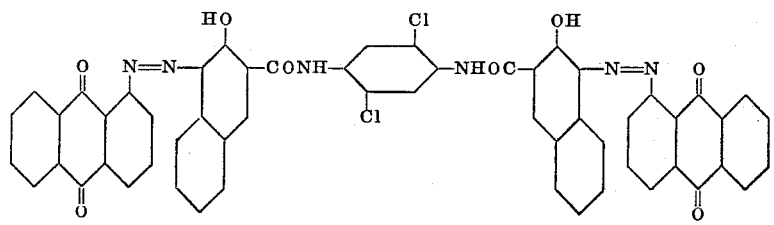
6. The dyestuff of the formula
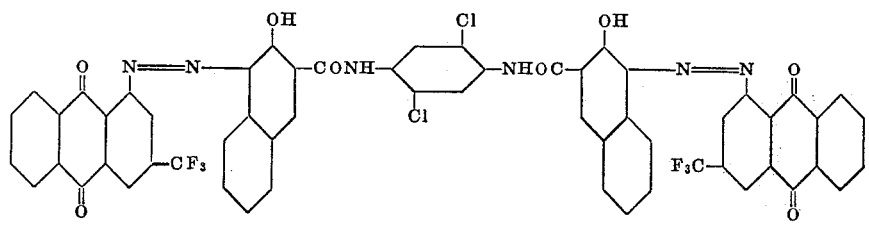
References Cited
UNITED STATES PATENTS
1,992,917   2/1935   Kirst et al. _____ 260—160 X
CHARLES B. PARKER, *Primary Examiner.*
DONALD M. PAPUGA, *Assistant Examiner.*